United States Patent
Yan et al.

(10) Patent No.: US 10,536,480 B2
(45) Date of Patent: Jan. 14, 2020

(54) METHOD AND DEVICE FOR SIMULATING AND DETECTING DDOS ATTACKS IN SOFTWARE DEFINED NETWORKING

(71) Applicant: SHENZHEN UNIVERSITY, Shenzhen, Guangdong (CN)

(72) Inventors: Qiao Yan, Guangdong (CN); Qingxiang Gong, Guangdong (CN); Jianyong Chen, Guangdong (CN)

(73) Assignee: SHENZHEN UNIVERSITY, Shenzhen (CN)

(*) Notice: Subject to any disclaimer, the term of this patent is extended or adjusted under 35 U.S.C. 154(b) by 135 days.

(21) Appl. No.: 15/922,902

(22) Filed: Mar. 15, 2018

(65) Prior Publication Data

US 2018/0324212 A1 Nov. 8, 2018

Related U.S. Application Data

(63) Continuation of application No. PCT/CN2017/088934, filed on Jun. 19, 2017.

(30) Foreign Application Priority Data

May 2, 2017 (CN) .......................... 2017 1 0301393

(51) Int. Cl.
*H04L 29/06* (2006.01)
*G06F 17/50* (2006.01)

(52) U.S. Cl.
CPC ...... *H04L 63/1458* (2013.01); *G06F 17/5009* (2013.01); *H04L 63/1425* (2013.01); *H04L 63/1433* (2013.01)

(58) Field of Classification Search
CPC ............ H04L 63/1425; H04L 63/1458; H04L 63/1466; H04L 63/1483; H04L 63/1491; H04L 63/1433; H04L 63/16; G06F 17/5009
See application file for complete search history.

(56) References Cited

U.S. PATENT DOCUMENTS 7,331,060 B1 * 2/2008 Ricciulli ............. H04L 63/1458
709/227
7,603,709 B2 * 10/2009 Lewis ................. H04L 63/0227
726/23

(Continued)

*Primary Examiner* — Hosuk Song (57) ABSTRACT

The present disclosure provides a method and a device for simulating and detecting DDoS Attacks in software defined networking. The method comprises: adding zombie hosts in a preset linear increasing mode and an incremental mode, and launching stealthy DDoS Attacks on a data plane to a preset target switch in a software defined networking through all zombie hosts; synchronously updating a pre-built attack flow monitoring table on a controller of the networking according to updating of flow tables on all switches; periodically detecting the monitoring table to determine whether the monitoring table includes a monitoring table entry having existence duration over a preset duration threshold; and determining that a network flow corresponding to the monitoring table entry is a stealthy attack flow on the data plane of the networking when the monitoring table includes the monitoring table entry having the existence duration over the preset duration threshold.

8 Claims, 3 Drawing Sheets

(56) References Cited

U.S. PATENT DOCUMENTS

| | | | | |
|---|---|---|---|---|
| 7,814,546 B1* | 10/2010 | Strayer | ............... | H04L 63/1416 726/23 |
| 8,464,346 B2* | 6/2013 | Barai | .................. | H04L 63/1433 380/200 |
| 8,627,477 B2* | 1/2014 | Chen | .................... | H04L 61/2514 726/24 |
| 8,706,866 B2* | 4/2014 | Noh | .................... | H04L 63/1458 370/254 |
| 8,997,236 B2* | 3/2015 | Lotem | ................ | H04L 63/1433 703/13 |
| 2017/0374084 A1* | 12/2017 | Inoue | ................. | H04L 63/1416 |

* cited by examiner

METHOD AND DEVICE FOR SIMULATING AND DETECTING DDOS ATTACKS IN SOFTWARE DEFINED NETWORKING

CROSS REFERENCE TO RELATED APPLICATION

The present application is a Continuation Application of PCT application No. PCT/CN2017/088934 filed on Jun. 19, 2017, which claims the benefit of Chinese patent application No. 201710301393.3 filed on May 2, 2017. All the above are hereby incorporated by reference.

TECHNICAL FIELD

The present disclosure relates to the technical field of network security, and in particular to a method and a device for simulating and detecting DDoS Attacks in software defined networking.

BACKGROUND

In recent years, networks with software defined networking (SDN) as the fundamental framework are booming. The software defined networking separates routing control from data forwarding in the traditional IP network to achieve centralized control and distributed forwarding, simplifies management and configuration of the network by providing a software programmable manner, but also expands attack surfaces of network distributed denial of service (DDoS) attacks.

Currently, DDoS Attacks on the control plane of the software defined networking are mostly considered when the DDoS Attacks in the software defined networking are to be controlled. However, previous researches have shown that DDoS Attacks on the data plane of the software defined networking are easier to threaten the software defined networking, and such DDoS Attacks may intentionally avoid most of DDoS detections on the software defined networking due to its stealthiness.

When the DDoS Attacks on the data plane of the software defined networking are to be simulated, a related algorithm suggests stealthy DDoS Attacks based on flow table entry timeout, wherein the algorithm periodically increases the number of zombie hosts by using an incremental mode till a flow table of a target switch approaches to a saturation condition, and each zombie host periodically transmits an attack packet at an attack interval which is smaller than the flow table entry timeout, so that flow entries of all attack packets are ensured to constantly exist in the flow table of the target switch, and then legitimate flow entries cannot be installed and processed. However, in the incremental mode, the attack speed of each zombie host cannot quickly reach a minimum attack speed (at the minimum attack speed, the flow entries of the target switch keep the saturation condition which approaches to the total size of the flow table).

The existing algorithm for detecting DDoS Attacks on the data plane of the software defined networking suggests: periodically acquiring flow entries from the target switch, checking the acquired flow entries, and determining whether a stealthy attack flow exists according to checking results. When such an algorithm is configured on a controller, a large amount of traffic loads will be added to a secure channel between the control plane and the data plane of the software defined networking; and when the algorithm is configured on each target switch, the logic centralized control idea of the software defined networking is incompatible, and it is complex that upgrading and networks of similar detecting algorithms need to be performed by mitigation measures (such as achievement of a blacklist and the like) according to the detecting results.

SUMMARY

The purpose of the present disclosure is to provide a method and a device for simulating and detecting DDoS Attacks in software defined networking, so as to solve the problems that the efficiency of simulating stealthy DDoS Attacks on the data plane of the software defined networking and detecting DDoS Attacks on the data plane of the software defined networking is relatively lower, and defection of the DDoS Attacks on the data plane of the software defined networking is relatively more complex to achieve in the prior art.

On the one hand, the present disclosure provides a method for simulating and detecting DDoS Attacks in software defined networking. The method comprises the following steps:

adding zombie hosts in a preset linear increasing mode and an incremental mode, and launching stealthy DDoS Attacks on a data plane to a preset target switch in a software defined networking through all zombie hosts;

synchronously updating a pre-built attack flow monitoring table on a controller of the software defined networking according to updating of flow tables on all switches in the software defined networking;

periodically detecting the attack flow monitoring table to determine whether the attack flow monitoring table includes a monitoring table entry having existence duration over a preset duration threshold; and determining that a network flow corresponding to the monitoring table entry having the existence duration over the preset duration threshold is a stealthy attack flow on the data plane of the software defined networking when the attack flow monitoring table includes the monitoring table entry having the existence duration over the preset duration threshold.

On the other hand, the present disclosure provides a device for simulating and detecting DDoS Attacks in software defined networking. The device comprises:

an attack simulating module, configured to add zombie hosts in a preset linear increasing mode and an incremental mode, and launch stealthy DDoS Attacks on a data plane to a preset target switch in a software defined networking through all zombie hosts;

a table updating module, configured to synchronously update a pre-built attack flow monitoring table on a controller of the software defined networking according to updating of flow tables on all switches in the software defined networking;

a timeout detecting module, configured to periodically detect the attack flow monitoring table to determine whether the attack flow monitoring table includes a monitoring table entry having existence duration over a preset duration threshold; and an attack flow determining module, configured to determine that a network flow corresponding to the monitoring table entry having the existence duration over the preset duration threshold is a stealthy attack flow on the data plane of the software defined networking when the attack flow monitoring table includes the monitoring table entry having the existence duration over the preset duration threshold.

In the present disclosure, the zombie hosts are added in the preset linear increasing mode and the incremental mode, the stealthy DDoS Attacks on the data plane are launched to the preset target switch in the software defined networking through all the zombie hosts, the pre-built attack flow monitoring table on the controller of the software defined networking is synchronously updated according to the updating of the flow tables on all the switches in the software defined networking, the attack flow monitoring table is periodically detected to determine whether the attack flow monitoring table includes the monitoring table entry having the existence duration over the preset duration threshold, and it is determined that the network flow corresponding to the monitoring table entry having the existence duration over the preset duration threshold is the stealthy attack flow on the data plane of the software defined networking when the attack flow monitoring table includes the monitoring table entry having the existence duration over the preset duration threshold. Therefore, the efficiency of simulating the stealthy DDoS Attacks on the data plane in the software defined networking is effectively improved through the combination of the linear increasing mode and the incremental mode, the detection of the stealthy DDoS Attacks on the data plane is achieved by building, updating and detecting the attack flow monitoring table on the controller, extra communication overhead of a secure channel of the software defined networking is effectively avoided, and the efficiency of detecting the stealthy DDoS Attacks on the data plane is improved.

DESCRIPTION OF THE EMBODIMENTS

To make the purpose, technical scheme and advantages of the disclosure more clearly understood, the disclosure is described in further detail below in conjunction with accompanying drawings and embodiments. It should be understood that the specific embodiments described below are merely to illustrate, but to limit, the disclosure.

The following illustrates concrete implementations of the present disclosure in detail in conjunction with specific embodiments.

Embodiment 1

Figure 1:
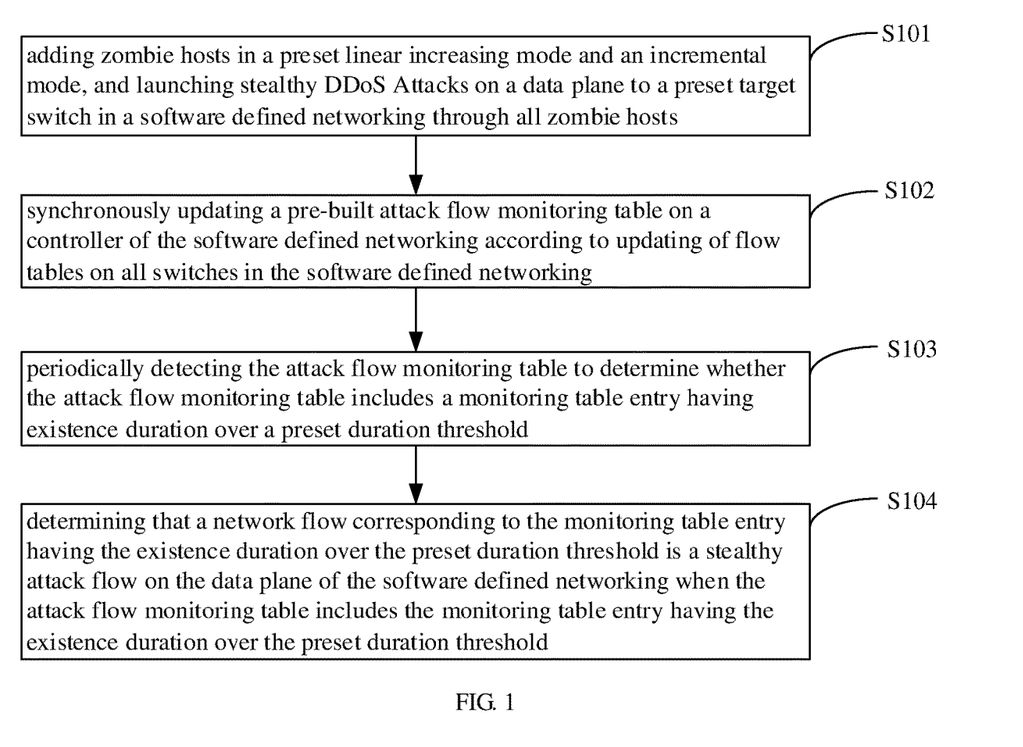
FIG. 1 is an implementation flowchart of a method for simulating and detecting DDoS Attacks in software defined networking, provided by embodiment 1 of the present disclosure.

FIG. 1 illustrates an implementation process of a method for simulating and detecting DDoS Attacks in software defined networking, provided by embodiment 1 of the present disclosure, and in order to facilitate describing, it only illustrates parts related to the embodiment of the present disclosure, which is described in details below.

At step S101, zombie hosts are added in a preset linear increasing mode and an incremental mode, and stealthy DDoS Attacks on a data plane are launched to a preset target switch in a software defined networking through all zombie hosts.

The embodiment of the present disclosure is applied to a platform or a system for simulating and detecting the stealthy DDoS Attacks on the data plane of the software defined networking, and the DDoS Attacks are distributed denial of service attack. The number of the zombie hosts is increased in multiple batches in the preset linear increasing mode when an attack simulator launches the stealthy DDoS Attacks on the data plane to the target switch in the software defined networking. In the procedure of increasing the number of the zombie hosts in multiple batches in the linear increasing mode, an attack is launched to the target switch at a normal flow speed of the software defined networking through the existing zombie hosts, and a next batch of the zombie hosts is added after a preset attack time interval.

In the embodiment of the present disclosure, a flow installing success rate of the target switch is detected in the linear increasing procedure; when the flow installing success rate is lower than a preset first success rate threshold, it may be considered that the flow table of the target switch is about to reach a saturation condition, and at this time, the linear increasing of the zombie hosts is stopped; next, the number of the zombie hosts is increased in a preset incremental mode (that is the zombie host is added one by one), and meanwhile, the attack is launched to the target switch at the normal flow speed through these zombie hosts; when the flow installing success rate of the target switch is detected to be lower than a preset second success rate threshold, it may be considered that the flow table of the target switch has reach the saturation condition, that is, flow table entries generated by the network flow sent by the zombie hosts are full of the flow table, thereby causing that the target switch cannot save a flow table entry for a normal network flow and then cannot respond a normal flow request; and at this time, the speed, at which all the zombie hosts launch attacks to the target switch, reaches the minimum attack speed.

Specifically, the flow installing success rate is a proportion of successfully installed flow table entries in the flow table of the target switch to all flow table entries to be installed. The first success rate is a relatively lower threshold of the flow installing success rate in the flow table of the target switch, the second success rate is a lowest threshold of the flow installing success rate in the flow table of the target switch, and the first success rate and the second success rate may be adjusted according to requirements on a saturation degree of the flow table of the target switch during attack simulating. The minimum attack speed means: at the minimum attack speed, the zombie host keeps the flow entries of the flow table of the target switch under the saturation condition which approaches to the total size of the flow table.

As an example, in the linear increasing mode, one zombie host is added at the first time, and total zombie hosts of $1*(1+1)/2$ are added; each zombie host launches an attack to the target switch at the normal flow speed of the software defined networking; two zombie hosts are added at the second time after an attack time interval, and total zombie hosts of $2*(2+1)/2$ are added; and the number of the zombie hosts to be added for each time is increased in the linear increasing mode.

In the embodiment of the present disclosure, the efficiency that the attach speed of the zombie host on the target switch reaches the minimum attack speed is effectively improved in the linear increasing mode and the incremental mode, and it is determined that DDoS Attacks, the attack speed of which is not over the minimum attack speed, are stealthy, so, all attacks when the zombie hosts are added and after the zombie hosts are added have the stealthiness characteristic.

At step S102, a pre-built attack flow monitoring table on a controller of the software defined networking is synchronously updated according to updating of flow tables on all switches in the software defined networking.

In the embodiment of the present disclosure, in order to avoid a problem that a large amount of traffic loads generates in a secure channel between the controller (the control plane) and the switch (the data plane) in the software defined networking, the controlled is selected to perform the detection of the stealthy DDoS Attacks on the data plane, and meanwhile, characteristics of a global topology information, dynamic programming and the like of the controller in the software defined networking may also be fully utilized, so the attach flow monitoring table is pre-built on the controller of the software defined networking, wherein the table entries of the attack flow monitoring table are called to be monitoring table entries in order to facilitate distinguishing. A structure of the monitoring table may include a switch identifier, a flow table entry sequence, a flow table entry matching field, a flow table entry adding time, a flow table entry existence duration and the like, wherein the switch identifier is configured to identify a switch where a flow table entry is located, the flow table entry sequence is configured to distinguish each monitoring table entry and each flow table entry corresponding to the monitoring table entry, the flow table entry adding time is a time of a flow table entry to be added in the flow table, the flow table entry existence duration is a duration of a flow table entry existing in the flow table, each monitoring table entry is respectively configured to monitor one corresponding flow table entry in the flow table of the switch, the switch identifier, the flow table entry sequence, the flow table entry matching field and the flow table entry adding time all may be acquired by the Packet-in event triggered by the switch, and the flow table entry existence duration may be acquired by reducing the flow table entry adding time from the existing time.

Preferably, a cookie field of the flow table entry is configured to the flow table entry sequence of the monitoring flow table entries in order to ensure the uniqueness of each monitoring table entry and the uniqueness of a flow table entry corresponding to each monitoring table entry and in order that a specific network flow may be quickly retrieved on the controller through the attack flow monitoring table.

In the embodiment of the present disclosure, the controller cannot determine the target switch before detection, so the updating of the flow table on all switches of the software defined networking is monitored by the attack flow monitoring table. When a switch of the software defined networking receive a network flow and the flow table of the switch does not exist a flow table entry corresponding to the network, the switch triggers the Packet-in event, namely sending a Packet-in message to the controller, and the controller makes a decision; and when the controller decides to add the flow table entry corresponding to the network flow in the flow table of the switch, the monitoring table entry corresponding to the flow table entry is added to the attack flow monitoring table, that is, the monitoring table entry corresponding to the network flow is added. When the network flow is over an idle-timeout so as to be removed by the switch or the switch receives a removing command to remove the network flow and the flow table entry corresponding to the network flow is removed, a Flow-removed event is triggered; and when the controller receives the Flow-removed message, the controller removes the monitoring table entry corresponding to the flow table entry (or the network flow), so that all the flow tables on all the switches of the software defined networking are unnecessary to be queried in real time or periodically, and the efficiency of monitoring the network flow is effectively improved.

At step S103, the attack flow monitoring table is periodically detected to determine whether the attack flow monitoring table includes a monitoring table entry having existence duration over a preset duration threshold.

In the embodiment of the present disclosure, the attack flow monitoring table on the controller is periodically detected to determine whether the attack flow monitoring table includes a monitoring table entry corresponding to a flow table entry having existence duration over a preset duration threshold, namely to determine whether the attack flow monitoring table includes a monitoring table entry having the existence duration over the duration threshold, and as well as determine whether the flow table includes a flow table entry having the existence duration over the duration threshold. Specifically, the duration threshold may be set according to experimental results.

At step S104, it is determined that a network flow corresponding to the monitoring table entry having the existence duration over the preset duration threshold is a stealthy attack flow on the data plane of the software defined networking when the attack flow monitoring table includes the monitoring table entry having the existence duration over the preset duration threshold.

In the embodiment of the present disclosure, when the attack flow monitoring table is determined to include a timeout monitoring table entry, it is considered that the network flow corresponding to the monitoring table entry is the stealthy attack flow on the data plane of the software defined networking, and the network flow is searched through the monitoring table entry, so as to achieve the detection on the stealthy DDoS Attacks on the data plane.

In the embodiment of the present disclosure, the zombie hosts are added in the linear increasing mode and the incremental mode, thereby effectively accelerating a procedure that the DDoS Attacks speed reaches the minimum attack speed while successfully simulating the stealthy DDoS Attacks on the data plane; and detection on the DDoS Attacks is achieved by building the attack flow monitoring table on the controller, and the attack flow monitoring table is updated through the Packet-in event and the Flow-removed event in the DDoS Attacks detecting procedure, thereby effectively avoiding extra communication loads, caused by the attack detection, in the secure channel between each switch and the controller and improving the efficiency of detecting the stealthy DDoS Attacks on the data plane.

The ordinary staff in this field can understand that: all or part steps to implement the above method embodiments may be completed through a program instructing related hardware, the program may be stored in a computer readable storage medium, the storage medium includes, for example, Read-Only Memory (ROM), Random Access Memory (RAM), disk or compact disk and so on.

Embodiment 2

Figure 2:
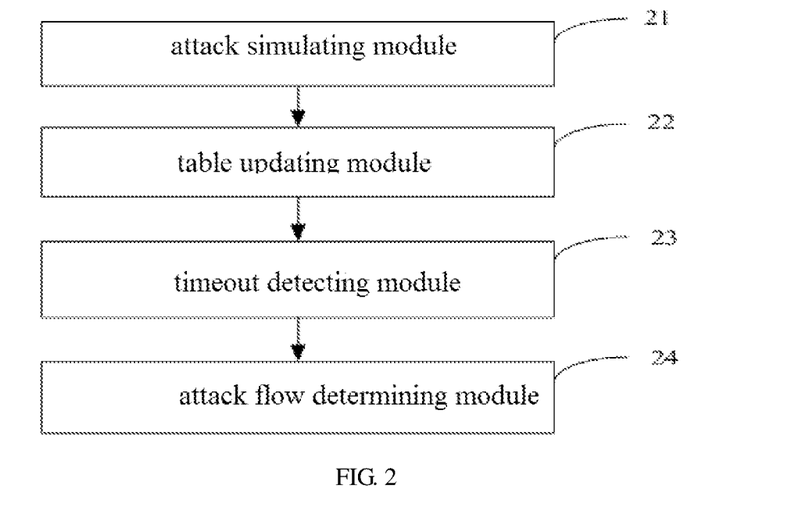
FIG. 2 is a structural schematic diagram of a device for simulating and detecting DDoS Attacks in software defined networking, provided by embodiment 2 of the present disclosure.

FIG. 2 illustrates a structure of a device for simulating and detecting DDoS Attacks in software defined networking, provided by embodiment 2 of the present disclosure, and in order to facilitate describing, it only illustrates parts related to the embodiment of the present disclosure, which comprises:

an attack simulating module 21, configured to add zombie hosts in a preset linear increasing mode and an incremental mode, and launch stealthy DDoS Attacks on a data plane on a preset target switch in a software defined networking through all zombie hosts;

a table updating module 22, configured to synchronously update a pre-built attack flow monitoring table on a controller of the software defined networking according to updating of flow tables on all switches in the software defined networking;

a timeout detecting module 23, configured to periodically detect the attack flow monitoring table to determine whether the attack flow monitoring table includes a monitoring table entry having existence duration over a preset duration threshold; and an attack flow determining module 24, configured to determine that a network flow corresponding to the monitoring table entry having the existence duration over the preset duration threshold is a stealthy attack flow on the data plane of the software defined networking when the attack flow monitoring table includes the monitoring table entry having the existence duration over the preset duration threshold.

Figure 3:
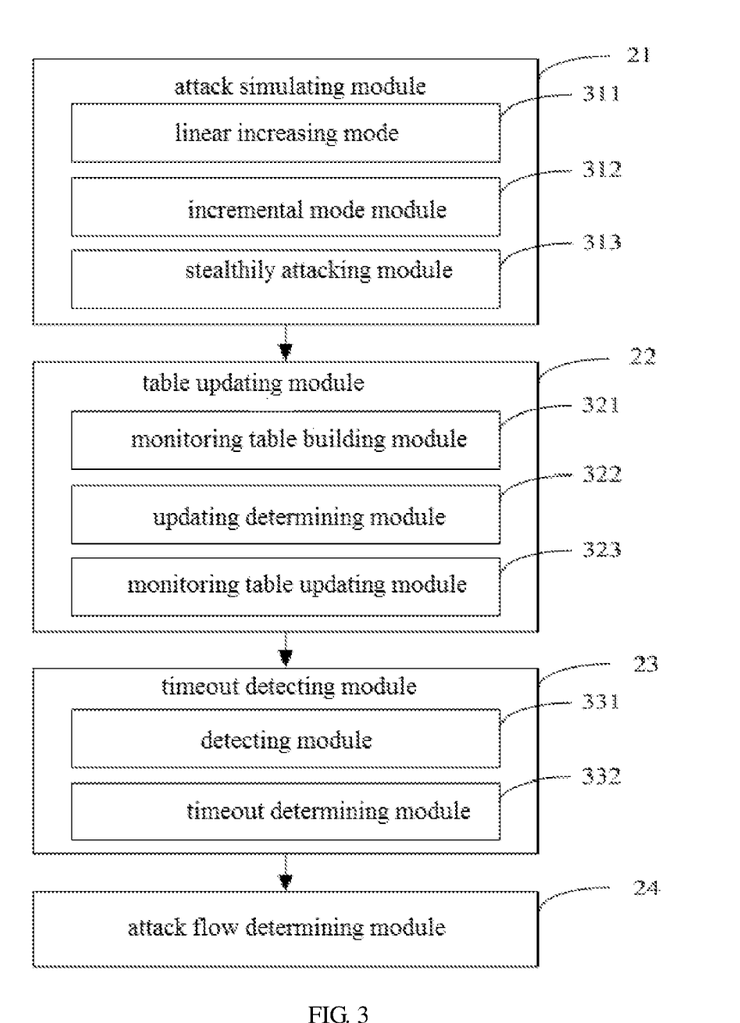
FIG. 3 is a preferable structural schematic diagram of a device for simulating and detecting DDoS Attacks in software defined networking, provided by embodiment 2 of the present disclosure.

Preferably, as shown in FIG. 3, the attack simulating module 21 comprises a linear increasing mode module 311, an incremental mode module 312 and a stealthily attacking module 313, wherein:

the linear increasing mode module 311 is configured to linearly increase the number of the zombie hosts, and then stop linearly increasing the number of the zombie hosts when detecting that a flow installing success rate of the target switch is lower than a preset first success rate threshold;

the incremental mode module 312 is configured to incrementally increasing the number of the zombie hosts, and then stop incrementally increasing the number of the zombie hosts when detecting that a flow installing success rate of the target switch is lower than a preset second success rate threshold; and the stealthily attacking module 313 is configured to send a network flow to the target switch at a minimum attack speed according to a normal flow speed of all the zombie hosts and the software defined networking.

Further preferably, the linear increasing mode module 311 comprises an increasing attacking module and an increasing stopping module, wherein:

the increasing attacking module is configured to increase the number of the zombie hosts in multiple batches according to the linear increasing mode and a preset attack time interval, and launch an attack on the target switch at the normal flow speed through each batch of the zombie hosts after each batch of the zombie hosts appears; and the increasing stopping module is configured to acquire the flow installing success rate of the target switch through the controller, and when detecting that the flow installing success rate is lower than the preset first success rate threshold, determine that the flow table approaches to saturation and stop the linear increasing mode.

Preferably, the table updating module 22 comprises a monitoring table building module 321, an updating determining module 322 and a monitoring table updating module 323, wherein:

the monitoring table building module 321 is configured to pre-build the attack flow monitoring table on the controller, wherein monitoring table entries of the attack flow monitoring table comprise a switch identifier, a flow table entry sequence, a flow table entry matching field, a flow table entry adding time and a flow table entry existence duration;

the updating determining module 322 is configured to respectively determine added flow table entries and removed flow table entries in the flow tables of all the switches according to a Packet-in event and a Flow-removed event triggered by all the switches; and the monitoring table updating module 323 is configured to add monitoring table entries corresponding to the added flow table entries and remove monitoring table entries corresponding to the removed flow table entries in the attack flow monitoring table.

Preferably, the timeout detecting module 23 comprises a detecting module 331 and a timeout determining module 332, wherein:

the detecting module 331 is configured to periodically detect the attack flow monitoring table to detect whether the attack flow monitoring table includes a monitoring table entry corresponding to a flow table entry having existence duration over the preset duration threshold; and the timeout determining module 332 is configured to determine that the attack flow monitoring table includes the monitoring table entry having the existence duration over the preset duration threshold when the attack flow monitoring table includes the monitoring table entry corresponding to the flow table entry having the existence duration over the preset duration threshold.

In the embodiments of the present disclosure, the zombie hosts are added in the linear increasing mode and the incremental mode, thereby effectively accelerating a procedure that the DDoS Attacks speed reaches the minimum attack speed while successfully simulating the stealthy DDoS Attacks on the data plane; and detection on the DDoS Attacks is achieved by building the attack flow monitoring table on the controller, and the attack flow monitoring table is updated through the Packet-in event and the Flow-removed event in the DDoS Attacks detecting procedure, thereby effectively avoiding extra communication loads, caused by the attack detection, in the secure channel between each switch and the controller and improving the efficiency of detecting the stealthy DDoS Attacks on the data plane.

In the embodiments of the present disclosure, each module of the device for simulating and detecting DDoS Attacks in software defined networking may be achieved by a corresponding hardware or software module, and each module may be an independent software or hardware module and may also be respectively integrated to be one software or hardware module in a system for simulating the DDoS Attacks in the software defined networking and a software defined networking system, which are not intended to limit the present disclosure herein.

The above are preferred embodiments of the disclosure merely, and are not intended to limit the disclosure. Any modifications, equivalent substitutes and improvements, etc., made within the spirit and principle of the disclosure all are intended to be included in the protection scope of the present disclosure.

What is claimed is:

1. A method for simulating and detecting DDoS Attacks in software defined networking, characterized in that the method comprises the following steps:

adding zombie hosts in a preset linear increasing mode and an incremental mode, and launching stealthy DDoS Attacks on a data plane to a preset target switch in a software defined networking through all zombie hosts;

synchronously updating a pre-built attack flow monitoring table on a controller of the software defined networking according to updating of flow tables on all switches in the software defined networking;

periodically detecting the attack flow monitoring table to determine whether the attack flow monitoring table includes a monitoring table entry having existence duration over a preset duration threshold; and determining that a network flow corresponding to the monitoring table entry having the existence duration over the preset duration threshold is a stealthy attack flow on the data plane of the software defined networking when the attack flow monitoring table includes the monitoring table entry having the existence duration over the preset duration threshold;

wherein the step of adding zombie hosts in a preset linear increasing mode and an incremental mode, and launching stealthy DDoS Attacks on a data plane to a preset target switch in a software defined networking through all zombie hosts comprises:

linearly increasing the number of the zombie hosts, and then stopping linearly increasing the number of the zombie hosts when detecting that a flow installing success rate of the target switch is lower than a preset first success rate threshold;

incrementally increasing the number of the zombie hosts, and then stopping incrementally increasing the number of the zombie hosts when detecting that a flow installing success rate of the target switch is lower than a preset second success rate threshold; and sending a network flow to the target switch at a minimum attack speed according to a normal flow speed of all the zombie hosts and the software defined networking.

2. The method according to claim 1, characterized in that the step of linearly increasing the number of the zombie hosts, and then stopping linearly increasing the number of the zombie hosts when detecting that a flow installing success rate of the target switch is lower than a preset first success rate threshold comprises:

increasing the number of the zombie hosts in multiple batches according to the linear increasing mode and a preset attack time interval, and launching an attack on the target switch at the normal flow speed through each batch of the zombie hosts after each batch of the zombie hosts appears; and acquiring the flow installing success rate of the target switch through the controller, and when detecting that the flow installing success rate is lower than the preset first success rate threshold, determining that the flow table approaches to saturation and stopping the linear increasing mode.

3. The method according to claim 1, characterized in that the step of synchronously updating a pre-built attack flow monitoring table on a controller of the software defined networking according to updating of flow tables on all switches in the software defined networking comprises:

pre-building the attack flow monitoring table on the controller, wherein monitoring table entries of the attack flow monitoring table comprise a switch identifier, a flow table entry sequence, a flow table entry matching field, a flow table entry adding time and a flow table entry existence duration;

respectively determining added flow table entries and removed flow table entries in the flow tables of all the switches according to a Packet-in event and a Flow-removed event triggered by all the switches; and adding monitoring table entries corresponding to the added flow table entries and removing monitoring table entries corresponding to the removed flow table entries in the attack flow monitoring table.

4. The method according to claim 1, characterized in that the step of periodically detecting the attack flow monitoring table to determine whether the attack flow monitoring table includes a monitoring table entry having existence duration over a preset duration threshold comprises:

periodically detecting the attack flow monitoring table to detect whether the attack flow monitoring table includes a monitoring table entry corresponding to a flow table entry having existence duration over the preset duration threshold; and determining that the attack flow monitoring table includes the monitoring table entry having the existence duration over the preset duration threshold when the attack flow monitoring table includes the monitoring table entry corresponding to the flow table entry having the existence duration over the preset duration threshold.

5. A device for simulating and detecting DDoS Attacks in software defined networking, characterized in that the device comprises:

an attack simulating module, configured to add zombie hosts in a preset linear increasing mode and an incremental mode, and launch stealthy DDoS Attacks on a data plane to a preset target switch in a software defined networking through all zombie hosts;

a table updating module, configured to synchronously update a pre-built attack flow monitoring table on a controller of the software defined networking according to updating of flow tables on all switches in the software defined networking;

a timeout detecting module, configured to periodically detect the attack flow monitoring table to determine whether the attack flow monitoring table includes a monitoring table entry having existence duration over a preset duration threshold; and an attack flow determining module, configured to determine that a network flow corresponding to the monitoring table entry having the existence duration over the preset duration threshold is a stealthy attack flow on the data plane of the software defined networking when the attack flow monitoring table includes the monitoring table entry having the existence duration over the preset duration threshold;

wherein the attack simulating module comprises:

a linear increasing mode module, configured to linearly increase the number of the zombie hosts, and then stop linearly increasing the number of the zombie hosts when detecting that a flow installing success rate of the target switch is lower than a preset first success rate threshold;

an incremental mode module, configured to incrementally increasing the number of the zombie hosts, and then stop incrementally increasing the number of the zombie hosts when detecting that a flow installing success rate of the target switch is lower than a preset second success rate threshold; and a stealthily attacking module, configured to send a network flow to the target switch at a minimum attack speed according to a normal flow speed of all the zombie hosts and the software defined networking.

6. The device according to claim 5, characterized in that the linear increasing mode module comprises:

an increasing attacking module, configured to increase the number of the zombie hosts in multiple batches according to the linear increasing mode and a preset attack time interval, and launch an attack on the target switch at the normal flow speed through each batch of the zombie hosts after each batch of the zombie hosts appears; and an increasing stopping module, configured to acquire the flow installing success rate of the target switch through the controller, and when detecting that the flow installing success rate is lower than the preset first success rate threshold, determine that the flow table approaches to saturation and stop the linear increasing mode.

7. The device according to claim 5, characterized in that the table updating module comprises:

a monitoring table building module, configured to pre-build the attack flow monitoring table on the controller, wherein monitoring table entries of the attack flow monitoring table comprise a switch identifier, a flow table entry sequence, a flow table entry matching field, a flow table entry adding time and a flow table entry existence duration;

an updating determining module, configured to respectively determine added flow table entries and removed flow table entries in the flow tables of all the switches according to a Packet-in event and a Flow-removed event triggered by all the switches; and a monitoring table updating module, configured to add monitoring table entries corresponding to the added flow table entries and remove monitoring table entries corresponding to the removed flow table entries in the attack flow monitoring table.

8. The device according to claim 5, characterized in that the timeout detecting module comprises:

a detecting module, configured to periodically detect the attack flow monitoring table to detect whether the attack flow monitoring table includes a monitoring table entry corresponding to a flow table entry having existence duration over the preset duration threshold; and a timeout determining module, configured to determine that the attack flow monitoring table includes the monitoring table entry having the existence duration over the preset duration threshold when the attack flow monitoring table includes the monitoring table entry corresponding to the flow table entry having the existence duration over the preset duration threshold.

* * * * *